US006455169B1

(12) United States Patent
Iwamoto et al.

(10) Patent No.: US 6,455,169 B1

(45) Date of Patent: Sep. 24, 2002

(54) INKJET RECORDING SHEET

(75) Inventors: Kiyoshi Iwamoto, Shizuoka (JP); Senichi Yoshizawa, Shizuoka (JP); Hiroyuki Onishi, Suwa (JP); Masaaki Itano, Suwa (JP); Akio Owatari, Suwa (JP)

(73) Assignees: Tomoegawa Paper Co., Ltd., Tokyo (JP); Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/419,819

(22) Filed: Oct. 18, 1999

Related U.S. Application Data

(63) Continuation-in-part of application No. 09/076,122, filed on May 12, 1998, now abandoned.

(30) Foreign Application Priority Data

May 13, 1997 (JP) .......................................... 137567/97

(51) Int. Cl.$^{7}$ ............................................... B32B 27/00

(52) U.S. Cl. ....................... 428/500; 428/522; 428/523; 428/704; 428/323

(58) Field of Search ................................ 428/500, 507, 428/511, 515, 520, 522, 523, 704, 323

(56) References Cited

U.S. PATENT DOCUMENTS 4,741,969 A * 5/1988 Hayama et al. ............. 428/514
4,830,911 A 5/1989 Kojima et al.
5,672,392 A 9/1997 DeClercq et al.
5,681,643 A 10/1997 Noguchi et al.
5,750,253 A 5/1998 Satake et al.
5,798,173 A 8/1998 Momma et al.

FOREIGN PATENT DOCUMENTS

EP 0 627 324 12/1994
JP 00 627 324 * 6/1992

OTHER PUBLICATIONS

Patent Abstracts of Japan, 97(11) (Nov. 28, 1997) (abstract of JP 9–183928).

* cited by examiner

*Primary Examiner*—Cynthia H. Kelly
*Assistant Examiner*—B. Shewareged
(74) *Attorney, Agent, or Firm*—Wenderoth, Lind & Ponack, LLP

(57) ABSTRACT

An inkjet recording sheet whose discoloration, which is caused with the passage of time, is prevented, the inkjet recording sheet comprising a substrate and an ink receptor layer formed on the substrate, the ink receptor layer containing a polymer obtained from a monomer component containing at least vinyl-polymerizable monomer containing a basic nitrogen atom, the ink receptor layer containing a polymerization inhibitor in an amount of 10 to 500 ppm.

7 Claims, No Drawings

INKJET RECORDING SHEET

This application is a continuation-in-part of now abandoned application, Ser. No. 09/076,122 filed on May 12, 1998, now abandoned.

FIELD OF THE INVENTION

The present invention relates to an inkjet recording sheet. More specifically, it relates to an inkjet recording sheet whose discoloration, which is caused with the passage of time, is prevented.

PRIOR ART OF THE INVENTION

Inkjet printers are widely used since they have features in clearness of colors, noiselessness and easiness in color expression. Inkjet printers use not a solvent-containing ink but a water-based ink for environmental safety. Generally, an ink contains, as main components, a colorant such as pigment or a dye, a water-based or water-soluble solvent, an additive, and the like. As an ink for an inkjet printer, there is used an ink which is not easily dried, in order to prevent the clogging of a nozzle caused by the drying of the ink.

A recording sheet for use with an inkjet printer is particularly required to have the capability of receiving water-based materials in order to cope with the above property of an ink. For this reason, there are generally used inkjet recording sheets having a structure in which an ink receptor layer capable of well receiving the ink is formed on a substrate.

There has been proposed an ink receptor layer which is formed by preparing, as a main component, a system containing a water-soluble polymer such as polyvinyl alcohol and a highly water-absorptive pigment such as silica and further incorporating other water-soluble polymer(s) and additives to the main component. The water-soluble polymer other than polyvinyl alcohol, etc., is used for improving the clearness of an image, the color formability of an ink or the fixing properties of an ink when the ink is used for recording with an inkjet printer. As the above "other" water-soluble polymer, a polymer containing a basic nitrogen atom has been proposed. The absorbability to an ink and the clearness of an image are improved by incorporating the above polymer.

An inkjet recording sheet having a conventional ink receptor layer containing the above polymer containing a basic nitrogen atom has no practically sufficient storage durability and has a defect that it turns yellowish or reddish with the passage of time. In recent years, further, almost all inkjet printers tend to be used for full color printing. A recording sheet for full color printing is required to have a high whiteness, and the above defect particularly remains to solve.

SUMMARY OF THE INVENTION

It is an object of the present invention to provide an inkjet recording sheet whose discoloration, which is caused with the passage of time, is prevented.

According to the present invention, there is provided an inkjet recording sheet comprising a substrate and an ink receptor layer formed on the substrate, the ink receptor layer containing a polymer obtained from a monomer component containing at least vinyl-polymerizable monomer containing a basic nitrogen atom, the ink receptor layer containing a polymerization inhibitor in an amount of 10 to 500 ppm, preferably 10 to 300 ppm, particularly preferably 15 to 200 ppm.

DETAILED DESCRIPTION OF THE INVENTION

The present invention has been accomplished on the basis of the finding that a polymerization inhibitor, as a stabilizer, which is contained in a vinyl-polymerizable monomer containing a basic nitrogen atom causes a discoloration.

The substrate for use in the inkjet recording sheet of the present invention includes non-transparent substrates such as paper, cloth and non-woven fabric, films obtained from plastics such as polyethylene terephthalate, diacetate cellulose, triacetate cellulose, an acrylic polymer, Cellophane, celluloid, polyvinyl chloride, polycarbonate and polyimide, a wooden plate and a glass plate. The substrate is selected as required depending upon an object in recording, use of a recorded image or adhesion to an ink receptor layer.

In the present invention, the ink receptor layer contains a polymer obtained from a monomer component containing at least a vinyl-polymerizable monomer containing a basic nitrogen atom. The vinyl-polymerizable monomer containing a basic nitrogen atom includes N,N-dimethylaminoethyl (meth)acrylate, N,N-diethylaminoethyl (meth)acrylate, acrylamide, diacetylacrylamide, N-methylolacrylamide, N-vinylpyridine, N-vinylpyrrolidone, N-vinyloxazoline, N-vinyloxazolidone, N-vinylformamide, N-vinylamine, and quaternary ammonium salts obtained from these. Of these, N,N-dimethylaminoethyl (meth)acrylate, N,N-diethylaminoethyl (meth)acrylate, N-vinylamine and quaternary ammonium salts of these are preferred. In the present invention, since a polymer obtained from a monomer component containing at least one monomer selected from the above N,N-dimethylaminoethyl (meth)acrylate, N,N-diethylaminoethyl (meth)acrylate, N-vinylamine or quaternary ammonium salts of these gives an inkjet recording sheet which is excellent in absorption of an ink and the clearness of a color image.

The present invention uses a homopolymer or a copolymer obtained from the above vinyl-polymerizable monomer containing a basic nitrogen atom. The above copolymer is obtained from a combination of the above monomers or from at least one of the above monomers and other vinyl monomer. The "other" vinyl monomer includes (meth) acrylic acid and ester derivatives thereof, and also includes vinyl alcohol, vinyl acetate, styrene and derivatives of these.

In the present invention, there may be incorporated a resin other than the polymer obtained from the vinyl-polymerizable monomer containing a basic nitrogen atom.

The above "other" resin includes an acrylic resin, a polyester resin, a polyurethane resin, a styrene-butadiene copolymer resin, an acrylonitrile-butadiene copolymer resin, a polyvinyl alcohol resin, a water-soluble polyvinyl acetal resin, a polyvinyl butyral resin, other vinyl resin, an amide resin, oxidized starch, casein, polyethylene oxide, a silicone resin, a rosin-modified maleic acid resin, a rosin-modified phenolic resin, an alkyd resin, and a coumarone-indene resin. Of these resin, a water-soluble resin such as a polyvinyl alcohol resin or a water-soluble polyvinyl acetal resin is preferred in view of the absorptivity to an ink, the drying properties of an ink and the clearness of an image.

In the present invention, it has been found that the discoloration can be prevented by decreasing the content of a polymerization inhibitor which is generally contained in a polymer obtained from a monomer component containing a vinyl-polymerizable monomer containing a basic nitrogen atom.

That is, it is required to adjust the amount of a polymerization inhibitor contained in the ink receptor layer in 10 to 500 ppm, and the amount thereof is preferably 10 to 300 ppm, particularly preferably 15 to 200. Further, the polymer obtained from a monomer component containing a vinyl-polymerizable monomer containing a basic nitrogen atom preferably contains a polymerization inhibitor in an amount of 25 to 1,200 ppm, more preferably 50 to 1,000 ppm.

When the amount of the polymerization inhibitor in the above ink receptor layer or polymer is less than the above lower limits, washing and purification are difficult in the production of a polymer, the productivity is poor and the yield is decreased. Further, there is another problem that inkjet recording properties are impaired since a solvent used for washing remains in the polymer and an image becomes blurred or dull (the clearness of colors is decreased). Further, when the amount of the polymerization inhibitor in a monomer before the polymerization is decreased, the stability of the monomer is impaired and a constant polymer can not be obtained under the influence of the passage of time after the production of the monomer so that the inkjet recording properties are impaired.

On the other hand, when the amount of the polymerization inhibitor is larger than the above upper limits, there is a problem that an inkjet recording sheet turns yellowish or reddish with the passage of time.

In the present invention, the method of decreasing the content of a polymerization inhibitor in the ink receptor layer is not specially limited. For example, the content of a polymerization inhibitor can be decreased by one of the following methods.

①A method in which the amount of a polymerization inhibitor to be added to the vinyl-polymerizable monomer containing a basic nitrogen atom is decreased, or no polymerization inhibitor is added, and a monomer is polymerized immediately, or within a short period of time, after it is produced, to produce a polymer.

②A method in which a polymer obtained by the polymerization is purified or washed to remove a polymerization inhibitor.

③A method in which a group containing a basic nitrogen atom is later introduced into a polymer containing no basic nitrogen atom.

The polymerization inhibitor includes diphenylpicrylhydrazyl (DPPH), di-p-fluorophenylamine, tri-p-nitrophenylmethyl, benzoquinone, chloranil, p-tert-butyl catechol, hydroquinone m-nitrobenzene, nitrobenzene and p-phenyldiamine.

In the present invention, a pigment may be incorporated into the ink receptor layer. The pigment can be selected from conventional fillers and organic or inorganic pigments such as silica, clay, mica, swelling mica, talc, kaolin, diatomaceous earth, calcium carbonate, barium sulfate, aluminum silicate, synthetic zeolite, alumina, zinc oxide, lithopone and satin white. Of these, silica, alumina and calcium carbonate are preferred in view of obtaining excellent inkjet recording properties. The average particle diameter (volume average particle diameter measured by coulter counter method) is preferably 5 to 25 μm, particularly preferably 5 to 15 μm. When the above particle diameter is less than 5 μm, the absorptivity to an 5 ink and the color formability of an ink may be impaired. When the above particle diameter exceeds 25 μm, the pigment may fall off or an image may be roughened.

In the present invention, the ink receptor layer preferably contains 5 to 100% by weight of a polymer obtained from a component containing vinyl-polymerizable monomer containing a basic nitrogen atom. When the above pigment is contained in combination, the ink receptor layer preferably contains 5 to 60% by weight of the above polymer. The content of the pigment in the ink receptor layer is preferably 40 to 95% by weight, more preferably 50 to 90% by weight, particularly preferably 60 to 80% by weight. The ink receptor layer containing the above polymer and the pigment in the above amount ratio particularly attains excellent absorptivity to an ink and excellent clearness of an image.

The ink receptor layer may contain other additive for improving water resistance and preventing bleeding. The above "other" additive includes a melamine formaldehyde resin, a urea formaldehyde resin, glyoxazole and zirconium carbonate ammonium. For further improving the productivity, recording properties or storage stability of an inkjet recording sheet, the ink receptor layer may contain various additives such as a dispersing agent, a fluorescent dye, a pH adjuster, an anti-foaming agent, a lubricant and an antiseptic.

The ink receptor layer is formed on a substrate by dissolving or dispersing materials for forming the ink receptor layer in water or a proper solvent to obtain a coating solution or dispersion and applying the coating solution or dispersion onto the substrate according to a proper application method such as a roll coating method, a blade coating method, a gravure coating method, comma coating method, a rod bar coating method, an air knife coating method or a dye coating method. Further, the above coating solution or dispersion may be laminated on the substrate by a hot melt coating method or a laminate coating method. The ink receptor layer may have a laminate structure of at least two layers.

The application amount of the ink receptor layer is preferably 5 to 30 $g/m^2$, particularly preferably 10 to 20 $g/m^2$ When the application amount exceeds 30 $g/m^2$, the ink receptor layer is not improved in properties any further. When the application amount is less than 5 $g/m^2$, the absorptivity to an ink may be insufficient.

The inkjet recording sheet of the present invention may be provided with added value by imparting its surface with a gloss. The gloss may be imparted by a method in which the ink receptor layer is formed according to a cast coating method, a method in which the ink receptor layer is surface treated with a calender or a method in which a glossy layer is laminated on the ink receptor layer. For obtaining an excellent gloss appearance, the layer imparted with gloss preferably has a glossiness of at least 10 according to a 60 degree surface glossiness test. The glossy layer preferably contains, as main components, the same resin and the same pigment as those used for the ink receptor layer, since the glossy layer is improved in adhesion to the ink receptor layer. The glossy layer is produced and laminated, for example, by a method in which a coating composition for forming the glossy layer is applied to a substrate film which shows poor adhesion to materials for forming the glossy layer, such as a polyolefin resin film, an ethylene tetrafluoride resin film or a film treated with a peeling silicone, then, the resultant laminate is stacked on the ink receptor layer, drying the stacked product and peeling the substrate film.

In the glossy layer, the amount ratio of a binder resin and a pigment is as follows. The amount of the binder resin based on the pigment is preferably 5 to 50% by weight, particularly preferably 5 to 30% by weight. For imparting an excellent gloss by means of the glossy layer without impairing the function of the ink receptor layer, the thickness of the glossy layer is preferably 5 to 12 μm, particularly preferably 8 to 10 μm.

EXAMPLES

The present invention will be explained with reference to Examples hereinafter. In Examples, "part" and "%" stand for "part by weight" and "% by weight" unless otherwise specified.

Preparation Examples 1–7

Polymers were prepared from monomers shown in the following Table 1 according to a solution polymerization method.

TABLE 1

| PEx. | Monomer containing basic nitrogen atom (A) | Co-monomer (B) | Co-polymer-ization ratio A/B | Polymer-ization inhibitor | Amount of polymer-ization inhibitor |
|---|---|---|---|---|---|
| 1 | Dimethyl aminoethyl methacrylate | Acrylic acid | 95/5 | Hydro-quinone monomethyl ether | 50 ppm |
| 2 | Quaternay ammonium salt from dimethyl-aminoethyl methacrylate | Styrene | 90/10 | Hydro-quinone mono-methyl ether | 50 ppm |
| 3 | Polyvinyl-amine | Nil | 100/0 | Hydro-quinone monomethyl ether | Nil |
| 4 | Polyvinyl-amine | Acrylic acid | 95/5 | Hydro-quinone monomethyl ether | Nil |
| 5 | Dimethyl-aminoethyl methacrylate | Acrylic acid | 95/5 | Hydro-quinone monomethyl ether | 250 ppm |
| 6 | Dimethyl-aminoethyl methacrylate | Acrylic acid | 95/5 | Hydro-quinone monomethyl ether | 500 ppm |
| 7 | Dimethyl-aminoethyl methacrylate | Acrylic acid | 95/5 | Hydro-quinone monomethyl ether | 1,000 ppm |

Notes:
PEx. = Preparation Example

In Preparation Example 3, the polymer was prepared by hydrolyzing a polyvinylformamide aqueous solution with sodium hydroxide.

In Preparation Example 4, the polymer was prepared by hydrolyzing a vinylformamide/acrylic acid (=95/5) copolymer aqueous solution with sodium hydroxide.

Examples 1–7

| Coating composition for ink receptor layer | |
|---|---|
| Polymer obtained in one of Preparation Examples 1 to 7 (solid content 37%) | 250 parts |
| Silica ("CARPLEX B5304F", supplied by Shionogi Pharmaceutical, average particle diameter: 5.3 $\mu$m) | 180 parts |
| Water | 850 parts |

The above coating composition was applied to a corona-discharge-treated 100 $\mu$m thick polyester film so as to form a coating having a dry weight of 15 g/m$^2$ and dried to form an ink receptor layer. In this manner, inkjet recording sheets of the present invention were obtained.

Comparative Example 1

An inkjet recording sheet was obtained in the same manner as in Example 1 except that the polymer contained in the coating composition for forming the ink receptor layer was replaced with a dimethylaminoethyl methacrylate/acrylic acid (=95/5) copolymer prepared from a commercially available dimethylaminoethyl methacrylate (containing 2,000 ppm of hydroquinone monomethyl ether) and acrylic acid.

Comparative Example 2

An inkjet recording sheet was obtained in the same manner as in Example 1 except that the polymer contained in the coating composition for forming the ink receptor layer was replaced with a polyvinyl alcohol ("GOHSENOL T-330, 10% aqueous solution, supplied by Nippon Gosei Kagaku K.K.).

Comparative Example 3

An inkjet recording sheet was obtained in the same manner as in Example 1 except that a copolymer obtained by fully washing the dimethylaminoethyl methacrylate/acrylic acid (=95/5) copolymer prepared in Comparative Example 1 with acetone and drying it was used.

The inkjet recording sheets obtained in Examples 1 to 7 and Comparative Examples 1, 2 and 3 were cut to a size of A4 (210 mm×297 mm), and color printing was effected on each sheet with an inkjet printer ("MJ-5000C" supplied by Seiko-Epson) using an inkjet printing ink ("MJIC2C" supplied by Seiko-Epson). The resultant printed products were evaluated for various properties or performances as follows. Table 2 shows the results.

(1) Performance of prevention of discoloration

A sheet was allowed to stand indoors for 7 days, and then evaluated for a degree of discoloration.

A: Almost no discoloration.

B: Intermediate state between A and C.

C: Turned yellowish or reddish.

(2) Color formation

A printed product was visually evaluated for clearness of an image and color formability of the ink.

A: Excellent image.

B: Intermediate state between A and C.

C: Poor image.

(3) Fixing properties

A sheet of paper was stacked on a printed product immediately after it was obtained, and a finger was rubbed against the paper to visually evaluate the transfer of the ink to the paper.

A: Almost no ink was transferred to the paper.

B: Intermediate state between A and C.

C: The ink was saliently transferred to the paper.

TABLE 2

| | Polymerization inhibitor | Prevention of discoloration | Color formability | Fixing properties |
|---|---|---|---|---|
| Ex. 1 | 17 | A | A | A |
| Ex. 2 | 17 | A | A | A |

TABLE 2-continued

| | Polymerization inhibitor | Prevention of discoloration | Color formability | Fixing properties |
|---|---|---|---|---|
| Ex. 3 | 33 | A | A | A |
| Ex. 4 | 33 | A | A | A |
| CEx. 1 | 680 | C | A | A |
| CEx. 2 | 0 | A | C | C |
| CEx. 3 | 3 | A | B | A |
| Ex. 5 | 85 | A | A | A |
| Ex. 6 | 170 | A | A | A |
| Ex. 7 | 340 | B | A | A |

Notes:
Ex. = Example, CEx. = Comparative Example

Values in the column of "Polymerization inhibitor" represent contents (ppm) of polymerization inhibitors in ink receptor layers.

The results in Table 2 clearly show that the inkjet recording sheets of the present invention are excellent in performance of prevention of discoloration and color formability, and they are also excellent in fixing properties such as absorptivity to the ink.

As explained above, according to the present invention, there is provided an inkjet recording sheet which is excellent in color formability and fixing properties required of inkjet recording sheets and which is also excellent in the performance of prevention of discoloration.

What is claimed is:

1. An inkjet recording sheet comprising a substrate and an ink receptor layer formed on the substrate, the ink receptor layer containing a polymer obtained from a monomer component containing at least a vinyl-polymerizable monomer containing a basic nitrogen atom selected from the group consisting of at least one monomer selected from the group consisting of N,N-dimethylaminoethyl (meth)acrylate, N,N-diethylaminoethyl (meth)acrylate, acrylamide, diacetylacrylamide, N-methylolacrylamide, N-vinylpyridine, N-vinyloxazoline, N-vinyloxazolidone, N-vinylformamide, N-vinylamine, and quaternary ammonium salts obtained from these, the ink receptor layer containing a polymerization inhibitor in an amount of 10 to 500 ppm.

2. An inkjet recording sheet according to claim 1, wherein the ink receptor layer contains 5 to 100% by weight of the vinyl-polymerizable monomer containing a basic nitrogen atom.

3. An inkjet recording sheet according to claim 1, wherein the above polymer contains the polymerization inhibitor in an amount of 25 to 1,200 ppm and the polymer is incorporated into the ink receptor layer so as to adjust the amount of the polymerization inhibitor contained in the ink receptor layer to 10 to 500 ppm.

4. An inkjet recording sheet according to claim 1, wherein the ink receptor layer contains a pigment in addition to the polymer and the content of the pigment in the ink receptor layer is 40 to 95% by weight.

5. An inkjet recording sheet according to claim 4, wherein the pigment has an average particle diameter of 5 to 25 μm.

6. An inkjet recording sheet according to claim 4, wherein the content of the pigment in the ink receptor layer is 5 to 60% by weight.

7. An inkjet recording sheet according to claim 1, wherein the vinyl-polymerizable monomer containing a basic nitrogen atom is at least one monomer selected from the group consisting of N,N-dimethylaminoethyl (meth)acrylate, N,N-diethylaminoethyl (meth)acrylate, acrylamide, diacetylacrylamide, N-methylolacrylamide, N-vinylpyridine, N-vinylpyrrolidone, N-vinyloxazoline, N-vinyloxazolidone, N-vinylformamide, N-vinylamine, and quaternary ammonium salts obtained from these.

* * * * *